(12) United States Patent
Hattori

(10) Patent No.: US 6,434,473 B1
(45) Date of Patent: Aug. 13, 2002

(54) GAS TURBINE AEROENGINE CONTROL SYSTEM

(75) Inventor: Yuichi Hattori, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,871

(22) Filed: Aug. 10, 2000

(30) Foreign Application Priority Data

Oct. 5, 1999 (JP) ............................................. 11-284471

(51) Int. Cl.[7] .............................................. G06F 19/00
(52) U.S. Cl. ........................ 701/100; 701/104; 60/239; 477/30
(58) Field of Search .......................... 701/99, 100, 103, 701/104; 60/239; 477/30; 700/287, 289

(56) References Cited

U.S. PATENT DOCUMENTS

| | | | | |
|---|---|---|---|---|
| 3,894,605 A | * | 7/1975 | Savadorini ..................... | 180/65 |
| 4,056,732 A | * | 11/1977 | Martin ......................... | 307/33 |
| 4,716,531 A | | 12/1987 | Saunders et al. ........... | 701/100 |

* cited by examiner

*Primary Examiner*—Yonel Beaulieu
(74) *Attorney, Agent, or Firm*—Arent Fox Kintner Plotkin & Kahn, PLLC

(57) ABSTRACT

In a control system for a gas turbine aeroengine having a control unit made up of an electronic control unit (ECU) which calculates a fuel flow rate command value based at least on the detected rotational speed of the turbine and the desired power output and a fuel control unit (FCU) including at least a fuel metering valve which meters fuel to be supplied to the engine based on the calculated fuel flow rate command value, the ECU is integrally connected to the FCU, thereby reducing the size and weight of the control units and hence, reducing the occurrence of resonance which would otherwise be likely to occur. In the system, an alternator is integrally connected to the FCU and the rotational speed of the turbine is detected based on the wave form generated by the alternator. Moreover, the ECU calculates the fuel flow rate command value such that the fuel flow rate to be supplied to the engine is brought to a prescribed value. This makes it unnecessary to provide the overspeed protector.

5 Claims, 7 Drawing Sheets

ASIC
Voltage monitor
Op amp
Comparator
Back up regulator

SCMC
32bit CPU core
RAM
Flash ROM
Timer
Serial I/O
Interrupt controller
Parallel I/O
10bit AD
PWM controller Power Device
Pch Power MOS FET
Nch Power MOS FET

136 POWER REGULATOR

80

80a

GAS TURBINE AEROENGINE CONTROL SYSTEM

BACKGROUND OF THE INVENTION

1. Field of the Invention

This invention relates to a control system for a gas turbine aeroengine.

2. Description of the Related Art

In an aircraft engine, as taught by U.S. Pat. No. 4,716,531, for example, a digitized electronic control unit including a microcomputer, i.e. FADEC (Full Authority Digital Electronic Control Unit) is widely used. The electronic control unit (hereinafter referred to as "ECU") determines a command value and sends the same to a fuel control unit (hereinafter referred to as "FCU") interposed in a fuel supply system that pumps fuel from a fuel tank and supplies it to a fuel nozzle installed in a combustion chamber of the engine. Based on the command sent from the ECU, the FCU controls fuel supply to the engine.

The ECU and the FCU (constituting the control unit) are generally located separately at a position above or below the main engine unit and are connected with each other by wiring harnesses, connectors, etc. As a result, the control unit is likely to be large in size and heavy in weight. Moreover, in a case of a gas turbine engine, since it rotates at a high speed, the rigidity of components of the control unit must be enhanced so as to prevent resonance from occurring. This further increases the weight.

SUMMARY OF THE INVENTION

An object of this invention is therefore to overcome the problems of the prior art by providing a control system for a gas turbine aeroengine in which the control units are configured to be reduced in size and weight and hence, reducing the occurrence of resonance which would otherwise be likely to occur.

For realizing this object, the present invention provides a system for controlling a gas turbine aeroengine having at least a turbine which is rotated by gas produced by the engine to rotate a rotor that sucks in air, having: turbine rotational speed detecting means for detecting a rotational speed of the turbine; desired power output detecting means for detecting a desired power output of the engine specified by an operator; an electronic control unit which calculates a fuel flow rate command value based at least on the detected rotational speed of the turbine and the desired power output; a fuel control unit including at least a fuel metering valve which meters fuel to be supplied to the engine based on the calculated fuel flow rate command value; and a fuel supplying system which supplies fuel to the engine through the fuel control unit; wherein the improvement comprises: the electronic control unit is integrally connected to the fuel control unit.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A control system for a gas turbine aeroengine according to a first embodiment of this invention will now be explained with reference to the drawings.

Figure 1:
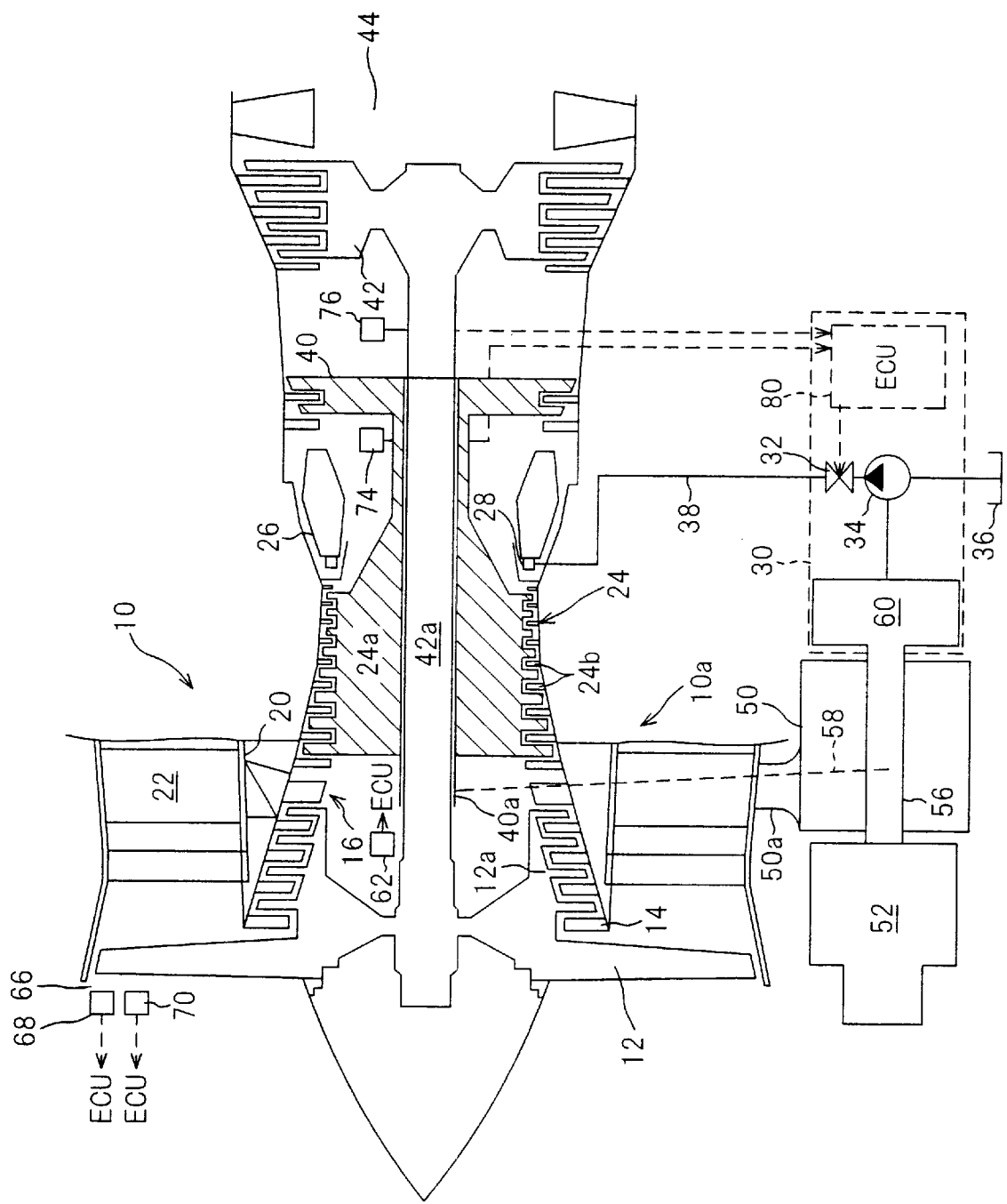
FIG. 1 is an overall schematic view of a control system for a gas turbine aeroengine according to the embodiment of this invention.

FIG. 1 is a schematic view showing the overall system.

The four types of gas turbine engines ordinarily used in aircraft are the turbojet engine, turbofan engine, turboprop engine and turboshaft engine. A two-spool (shaft turbofan) engine will be taken as an example in the following explanation.

In FIG. 1, reference symbol 10 designates a turbofan engine and 10a its main engine unit. The engine 10 is mounted at an appropriate location on an airframe (not shown).

The engine 10 is equipped with a fan (rotor blades) 12 that sucks in air while rotating rapidly. A rotor 12a is formed integrally with the fan 12. The rotor 12a and a stator 14 facing it, together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan is balanced by a force of reaction that acts on the aircraft as a propulsive force or thrust. Much of the propulsion is produced by the air flow from the fan. The air compressed by the low-pressure compressor 16 flows rearward to a high-pressure compressor 24 where it is further compressed by a rotor 24a and a stator 24b and then flows to a combustion chamber 26.

The combustion chamber 26 is equipped with fuel nozzles 28 that pressurize fuel metered by the FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

Thus, the FCU 30 is interposed in the fuel supply system which comprises the fuel tank 36, the fuel supply line 38 and the fuel nozzle 28, etc. In other words, the fuel supply system is configured to supply fuel to the engine 10 through the FCU 30.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion flows to a high-pressure turbine 40 and rotates the high-pressure turbine 40 at high speed. The high-pressure turbine 40 is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which it rotates at a relatively low speed. The low-pressure turbine 42 is connected to the rotor 12a of the low-pressure compressor 16 through a low-pressure turbine shaft 42a. The rotor 12a is therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and an unshown gear mechanism including a bevel gear etc.) so as to pull in air needed for combustion.

The rotation of the shaft 56 is also transmitted to a PMA (Permanent Magnet Alternator) 60 (which is connected integrally with the FCU 30 to supply electric power thereto) and the fuel pump 34. The fuel pump 34 is therefore driven to spray fuel from the fuel nozzles 28 as explained above. The resulting air-fuel mixture is ignited to start combustion.

When the engine 10 reaches a self-sustaining speed, the rotation of the high-pressure turbine shaft 40a is transmitted back through the drive shaft 58 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the rotational speed of the low-pressure turbine (speed of the low-pressure turbine shaft 42a, hereinafter referred to as "N1"). As regards the rotational speed of the high-pressure turbine (speed of the high-pressure turbine shaft 40a, hereinafter referred to as "N2"), no sensor is provided and instead, the rotational speed N2 is detected from a wave form generated by the PMA 60, as will be explained later.

A T1 sensor (temperature sensor) 68 and a P1 sensor (pressure sensor) 70 installed near an air intake 66 at the front of the main engine unit 10a output signals proportional to the temperature T1 and the pressure P1 of the inflowing air at that location. A P0 sensor (pressure sensor) 72 (not shown in FIG. 1) installed inside the ECU (Electronic Control Unit; explained below) outputs a signal proportional to atmospheric pressure P0 exerting on the engine 10.

A P3 sensor (pressure sensor) 74 installed downstream of the rotor 24a outputs a signal proportional to the output pressure P3 of the high-pressure compressor 24. An ITT sensor (temperature sensor) 76 installed at an appropriate location between the high-pressure turbine 40 and the low-pressure turbine 42 outputs a signal proportional to the temperature (representative engine temperature) ITT at that location.

The aforementioned ECU (designated by reference numeral 80) is incorporated integrally with the FCU 30 at an upper end position of the main engine unit 10a. The outputs of the sensors mentioned above are sent to the ECU 80.

Figure 2:
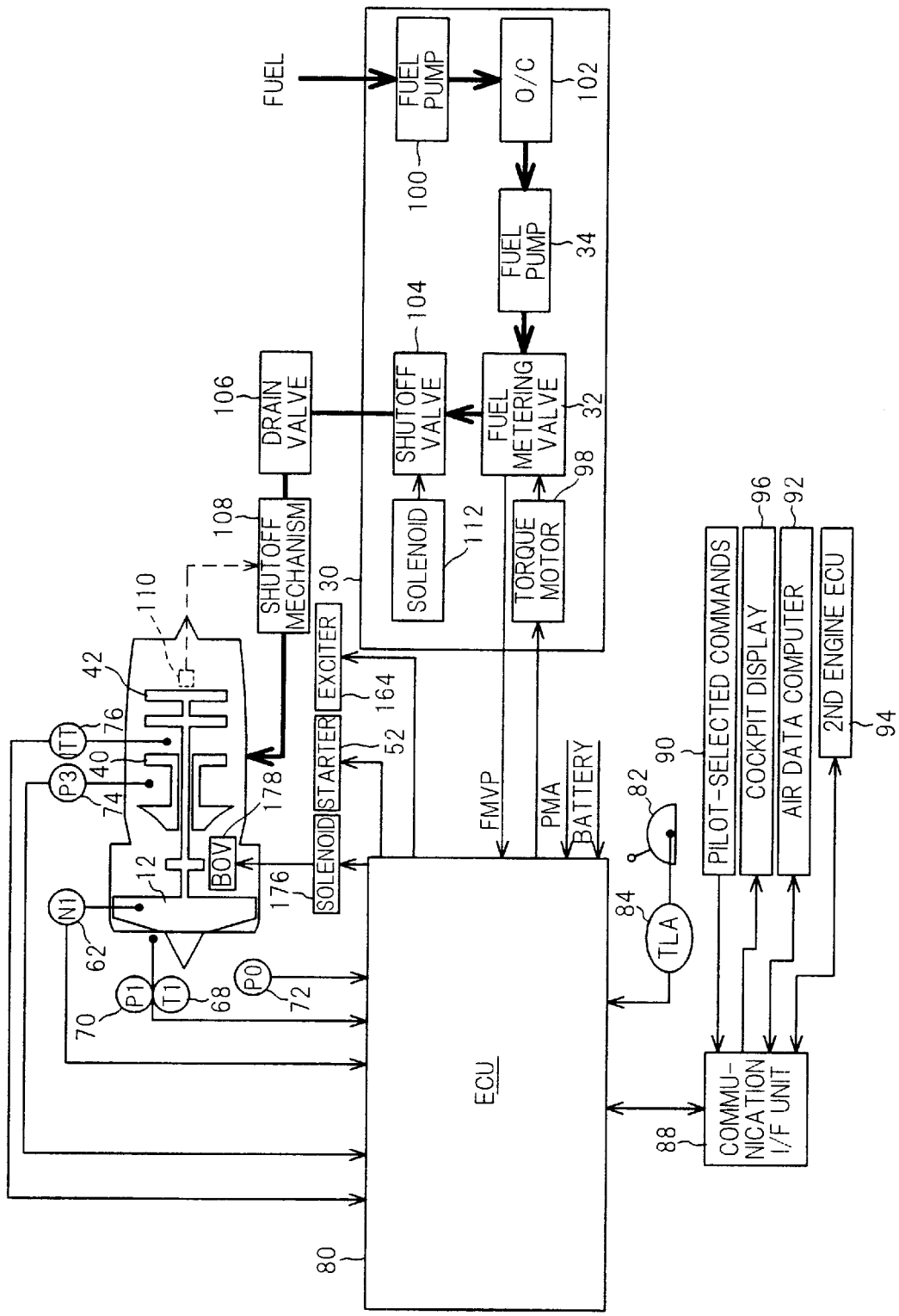
FIG. 2 is a block diagram showing the configuration of an ECU and an FCU in the system illustrated in FIG. 1.

The ECU 80 and the FCU 30 are illustrated in the block diagram of FIG. 2, with the overall configuration of the FCU 30 being shown in detail.

Figure 3:
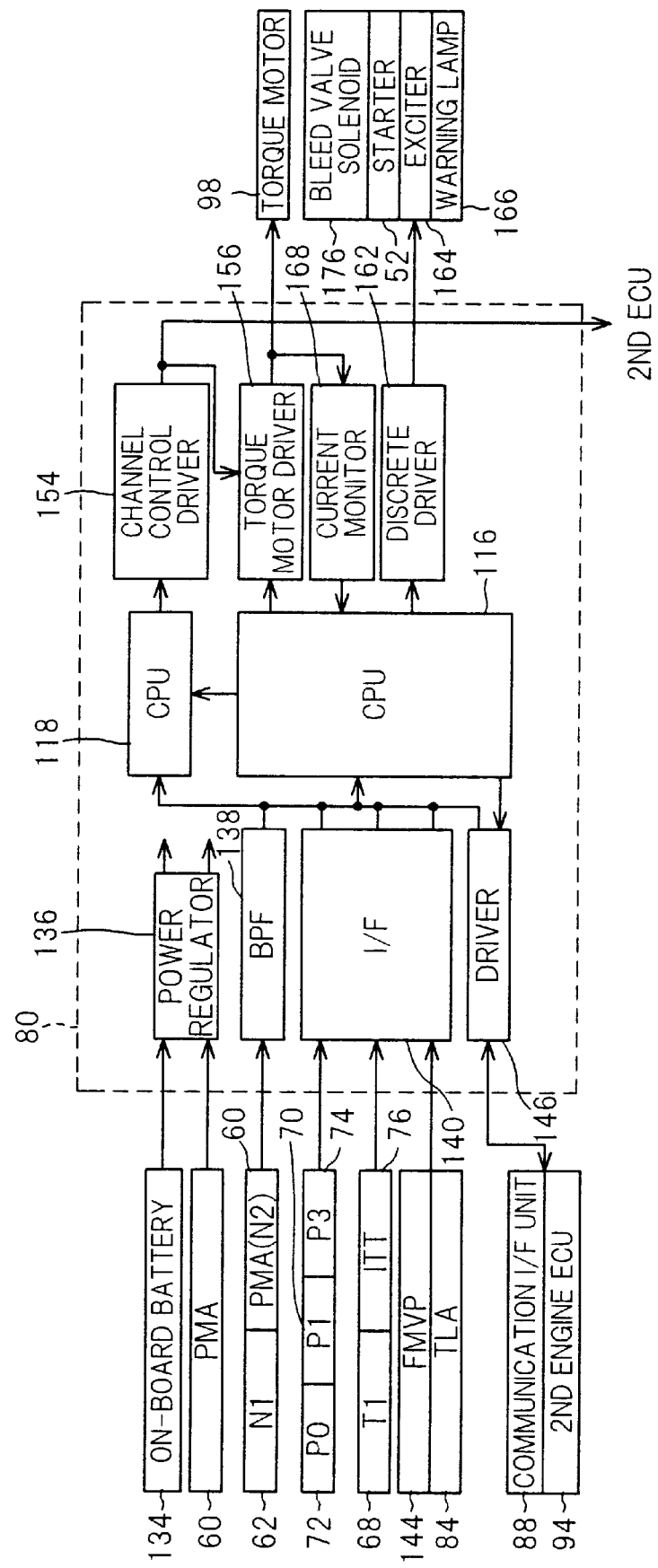
FIG. 3 is a block diagram concretely showing the configuration of the ECU illustrated in FIG. 2.

In addition to the group of sensors set out above, a TLA (throttle lever position) sensor 84 installed near a throttle lever (thrust lever) 82 provided near the pilot (operator)'s seat (cockpit; not shown) outputs a signal proportional to the throttle lever position TLA specified by the pilot (corresponding to a desired power output specified by the operator (pilot)). The output of the TLA sensor 84 is also forwarded to the ECU 80. In FIGS. 2 and 3, the sensors (P0 sensor, TLA sensor etc.) are indicated by the symbols for the parameters they detect (P0, TLA etc).

An FMVP sensor (fuel metering valve position sensor; not shown in FIG. 2) installed at an appropriate location in the FCU 30 outputs a signal proportional to the valve position FMVP of the fuel metering valve 32. The output of the FMVP sensor is also forwarded to the ECU 80.

The ECU 80 is also connected with a communication interface unit 88 through which it receives (or sends) pilot-selected commands 90 from devices other than the throttle lever 82, data from an on-board computer (Air Data Computer or ADC) 92, and data from an ECU 94 of a second engine (not shown). The data in the ECU 80 is sent through the communication interface unit 88 to be displayed on a display 96 located in the cockpit.

The ECU 80 has a CPU as will be explained later and based on the input data, the ECU 80 calculates a command value (control input or manipulated variable) for supplying fuel to the engine 10 at the flow rate needed to bring low-pressure turbine shaft speed (low-pressure turbine speed) N1 to the speed corresponding to the throttle lever position (pilot desired output) TLA. The command value is calculated as a command value indicating the amount of current to be supplied to a torque motor 98. The command value is sent to the FCU 30.

The ECU 80 further monitors whether or not the detected values of the low-pressure turbine speed N1 and the high-pressure turbine speed N2 exceed predetermined values (e.g., values equivalent to 107% of the respective maximum speeds). When either of the detected low-pressure turbine speed N1 and high-pressure turbine speed N2 exceeds the predetermined value, the ECU 80 makes an overspeed determination and then determines a current command value to be supplied to a torque motor 98 and sends the same to the FCU 30 for bringing the fuel flow rate to the engine 10 to a prescribed value, specifically to zero or a minimum value. Thus, the ECU 80 is configured to have the function of overspeed protector, making it unnecessary to install the overspeed protector.

The FCU 30 is equipped with a low-pressure fuel pump 100 that pumps fuel from the fuel tank 36 (not shown in FIG. 2) and supplies it to the fuel pump 34 through a filter (and oil cooler) 102. The fuel pump 34 raises the fuel to a high pressure and supplies it to the fuel metering valve 32. The fuel metering valve 32 is connected with a torque motor 98 that determines its spool position. The flow rate of the fuel pressurized by the fuel pump 34 is therefore adjusted (metered) by the fuel metering valve 32 in response to the spool position thereof.

The metered fuel is supplied to the fuel nozzles 28 (not shown in FIG. 2) through a shutoff valve 104, a drain valve 106 and a shutoff mechanism 108.

An emergency stop switch 110 is connected to the low-pressure turbine shaft 42a (not shown in FIG. 2). If the low-pressure turbine shaft 42a should be displaced for some reason, the emergency stop switch 110 will turn on to operate the shutoff mechanism 108 and mechanically block supply of fuel to the fuel nozzles 28. In addition, a solenoid 112 is provided in association with the shutoff valve 104. The solenoid 112 is responsive to the pilot-selected command(s) 90 for operating the shutoff valve 104 to block supply of fuel to the fuel nozzles 28.

The configuration of the ECU 80 will now be explained with reference to FIG. 3.

The ECU 80 is connected to the PMA 60 and an on-board battery 134 installed at an appropriate location in the airframe (not shown). Electric power is supplied through a selector circuit (not shown) from whichever of the PMA 60 and the on-board battery 134 the circuit selects as providing the higher voltage. The input power is regulated to the operating voltage of the ECU and the operating voltage of a driver (explained below) by a power regulator 136.

In the ECU 80, the outputs of the N1 sensor 62 for detecting the low-pressure turbine speed N1 is input to the ECU 80, passed through a BPF (bandpass filter) 138, and are stored in a RAM (random access memory; not shown). As mentioned before, the high-pressure turbine speed N2 is detected based on the wave form generated by PMA 60, and this is conducted by the ECU 80.

The outputs of the P0 sensor 72, P1 sensor 70 and P3 sensor 74 for detecting the pressures P0, P1 and P3 at different engine locations and the outputs of the T1 sensor 68 and ITT sensor 76 for detecting the temperatures T1 and ITT are stored in the RAM through an I/F (interface) 140. The output of the FMVP sensor 144 for detecting the position FMVP of the fuel metering valve 32 (not shown in FIG. 3) and the output of the TLA sensor 84 for detecting the throttle lever position TLA are also stored in the RAM through the I/F 140. The communication interface (I/F) unit 88 is connected to the ECU 80 through a driver 146.

The ECU 80 has a first CPU 116 and a second CPU 118. The first CPU 116 processes the input values in accordance with instructions stored in a ROM (read-only memory; not shown). By this, as mentioned earlier, it calculates the fuel flow rate command value (control input) for supplying fuel to the engine 10 at the flow rate needed to bring the low-pressure turbine speed N1 to the speed corresponding to the throttle lever position TLA (the desired power output specified by the operator), as the command value indicating the amount of current to be passed through the torque motor 98.

The first CPU 116 also monitors whether or not the detected values of the low-pressure turbine speed N1 and the high-pressure turbine speed N2 exceed predetermined values (e.g., values equivalent to 107% of the respective maximum speeds). When either of the detected low-pressure turbine speed N1 and high-pressure turbine speed N2 exceeds the predetermined values, the first CPU 116 makes an overspeed determination and then calculates the fuel flow rate command value (as the current command value to be supplied to the torque motor 98) such that the fuel flow rate. to be supplied to the engine 10 is brought to a prescribed value, specifically to zero or a minimum value.

The second CPU 118 similarly calculates a command value (as a current value) to be supplied to the torque motor 98. The first CPU 116 sends the calculation result (the command value) to the second CPU 118. The second CPU 118 compares the input command value with its own calculated result (the command value).

The second CPU 118 is connected to a channel control driver 154. When the second CPU 118 discriminates that its own calculation result and the calculation result of the first CPU 116 coincide, more precisely that they completely coincide or at least substantially coincide, it produces no output. In this case, the channel control driver 154 operates a torque motor driver 156 so as to output the calculation result of the first CPU 116 to the FCU 30 and drive the torque motor 98.

On the other hand, when the second CPU 118 discriminates that its own calculation result and the calculation result of the first CPU 116 do not coincide, it sends a signal to the channel control driver 154. In this case the channel control driver 154 prevents the torque motor driver 156 from producing an output when it receives an output from the second CPU 118. It also sends a signal to a second ECU (not shown) such that the second ECU outputs its similar calculation result so as to drive a second torque motor (not shown) of the FCU 30. Since such a dual lane in the control system has no direct relationship with the gist of this invention, further explanation will be omitted.

The remaining features of the ECU 80 in FIG. 3 will now be explained.

The first CPU 116 and the second CPU 118 control the operation of the starter 52 and an exciter 164 through a discrete driver 162 in response to the operating condition of the engine 10. Further, when an overspeed condition has arisen or when otherwise necessary, the first CPU 116 informs the pilot by means of a warning lamp 166 installed in the cockpit.

The current command value supplied to the torque motor 98 is detected by a current monitor 168 and used to monitor the operation of the torque motor 98. The first CPU 116 and second CPU 118 respond to torque motor 98 failure discrimination by blocking the output of the torque motor driver 156 and sending a signal through the channel control driver 154 to the second ECU. As a result, the second torque motor connected to the second ECU is used in place of the malfunctioning torque motor 98. In addition, the first CPU 116 and the second CPU 118 control the operation of a bleed valve 178 (see FIG. 2) through a bleed value solenoid 176.

Based on the above, the characteristic features of the control system for a gas turbine aeroengine according to this embodiment will be explained. Since the characteristic features reside in reducing the size and weight, the explanation will be made putting an emphasis on that aspect.

Figure 4:
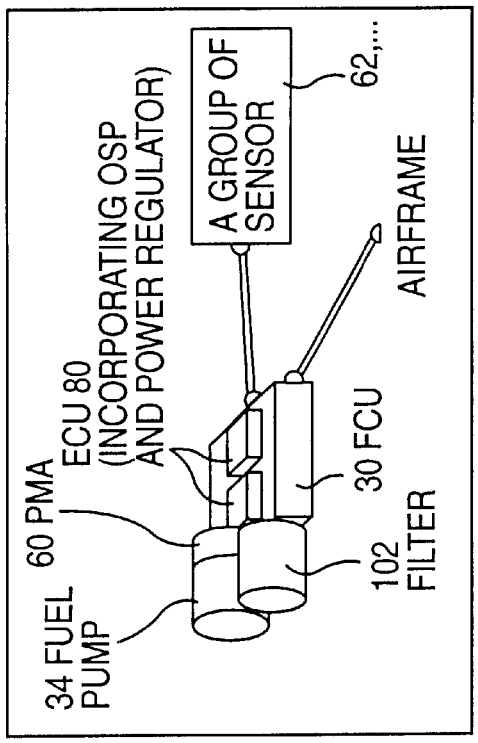
FIG. 4 is a view contrasting a case in which the ECU and the FCU (constituting the control unit) are located separately as is done in the prior art (illustrated on the left) and a case in which they are configured to be located as an unitary, as in this embodiment (illustrated on the right), when they are realized as a hardware structure.
Figure 4:
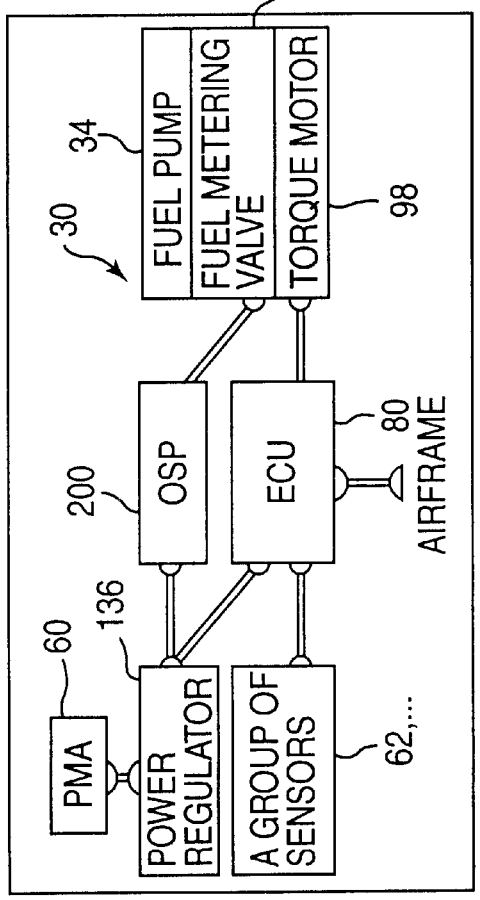

FIG. 4 is a view contrasting a case in which the ECU 80 and the FCU 30 (constituting the control unit) are located separately as is done in the prior art (illustrated on the left) and a case in which they are configured to be located as a unitary, as in this embodiment (illustrated on the right), when they are realized as a hardware structure.

In the prior art, since the ECU 80 and the FCU 30 constituting the control unit are located independently, the size and weight of the control unit are disadvantageously increased. Further, this requires an enhanced rigidity of the components for avoiding occurrence of resonance which further increases the weight of the control unit.

Furthermore, since an overspeed protector (illustrated as "OSP" in FIG. 4) 200 referred to in the US Patent is added independently of the ECU 80, the number of components (other than a group of sensors including the N1 sensor 62, etc.) is five. Thus, the control unit in the prior art is less likely to be small. Moreover, the weight of the harnesses connecting the separate components can not be neglected.

In view of the above, the control system for a gas turbine aeroengine according to the embodiment is configured to reduce the size by combining the ECU 80 and the FCU 30 into a single unit, as illustrated in the right of the figure. This also decreases the occurrence of resonance which would otherwise be likely to occur.

Figure 5:
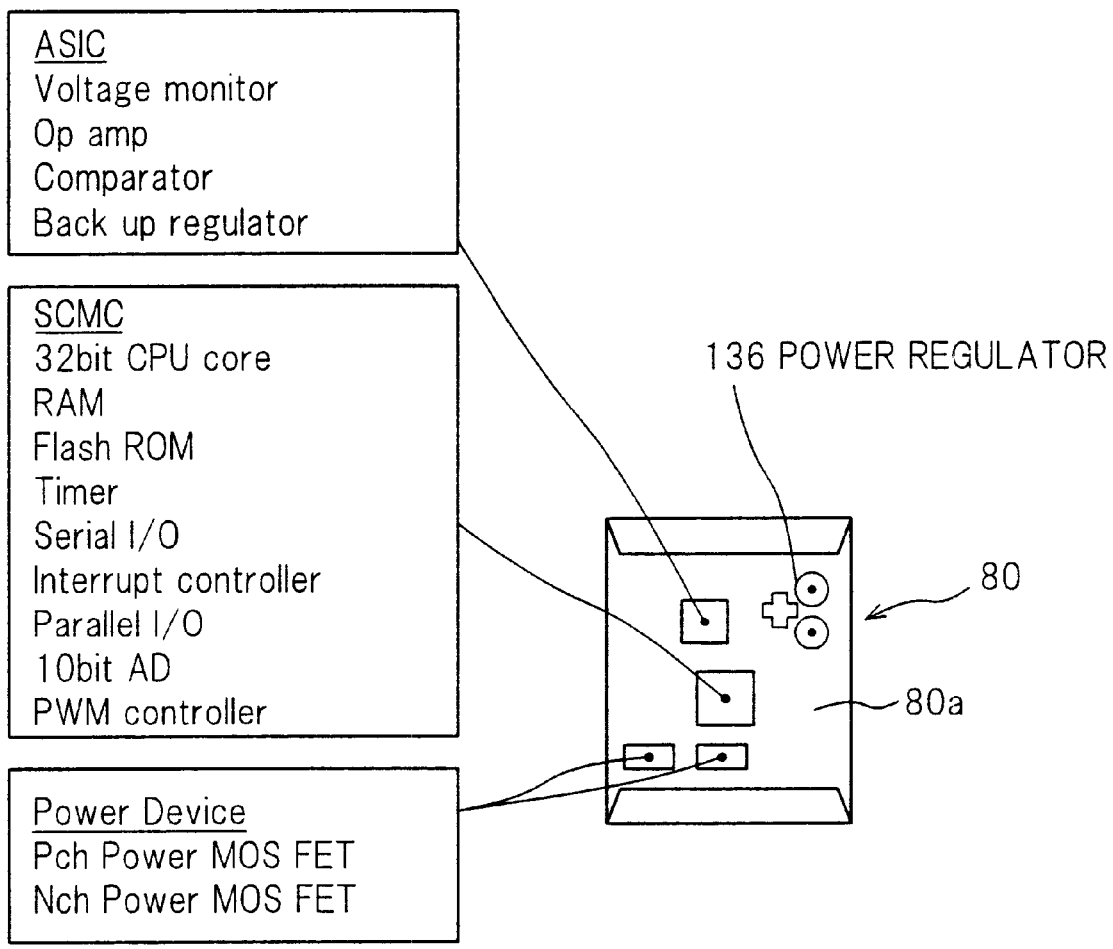
FIG. 5 is an explanatory view showing how the ECU is to be embodied in a hardware construction.

To be more specific, when the ECU 80 is to be embodied in a hardware construction, as shown in FIG. 5, it should first be integrated into one chip using known ASIC, SCMC and bare-chip mounting techniques. The chip should then be mounted on a board 80a in a size of 40×50 mm. In addition, the aforesaid power regulator 136 should be mounted on the same board 80a. Although not shown, the second ECU should be fabricated and mounted on a similar board in the same manner. As illustrated in FIG. 4, the FCU 80, thus fabricated, should then be mounted on the FCU 30 in the vicinity of the filter (and oil cooler) 102.

Further, as mentioned above with reference to FIG. 3, since the ECU 80 is configured to have the function of overspeed protector, the overspeed protector 200 illustrated in the left of FIG. 4 is no longer needed.

Furthermore, since the PMA 60 is integrally connected to the FCU 30 to supply electric power thereto and is located in the vicinity of the ECU 80 such that the ECU 80 detects the high-pressure turbine speed N2, the N2 sensor is no longer needed.

Having been configured in the foregoing manner, as illustrated in FIG. 4, the number of components of the control unit in this embodiment is greatly reduced. The control unit is thus reduced in size and hence, its weight is markedly reduced. More precisely, the embodiment has succeeded in reducing the weight of the control unit (except for the FCU 30) from 10 kg (which is a value when located in the prior art manner) to 2 kg. This also decreases the occurrence of resonance which would otherwise be likely to occur at the components.

Moreover, this facilitates maintenance of the control unit. And, since the ECU 80 is connected to the FCU 30 (which is interposed in the fuel supply system), it becomes possible to cool the ECU 80 by fuel.

Figure 6:
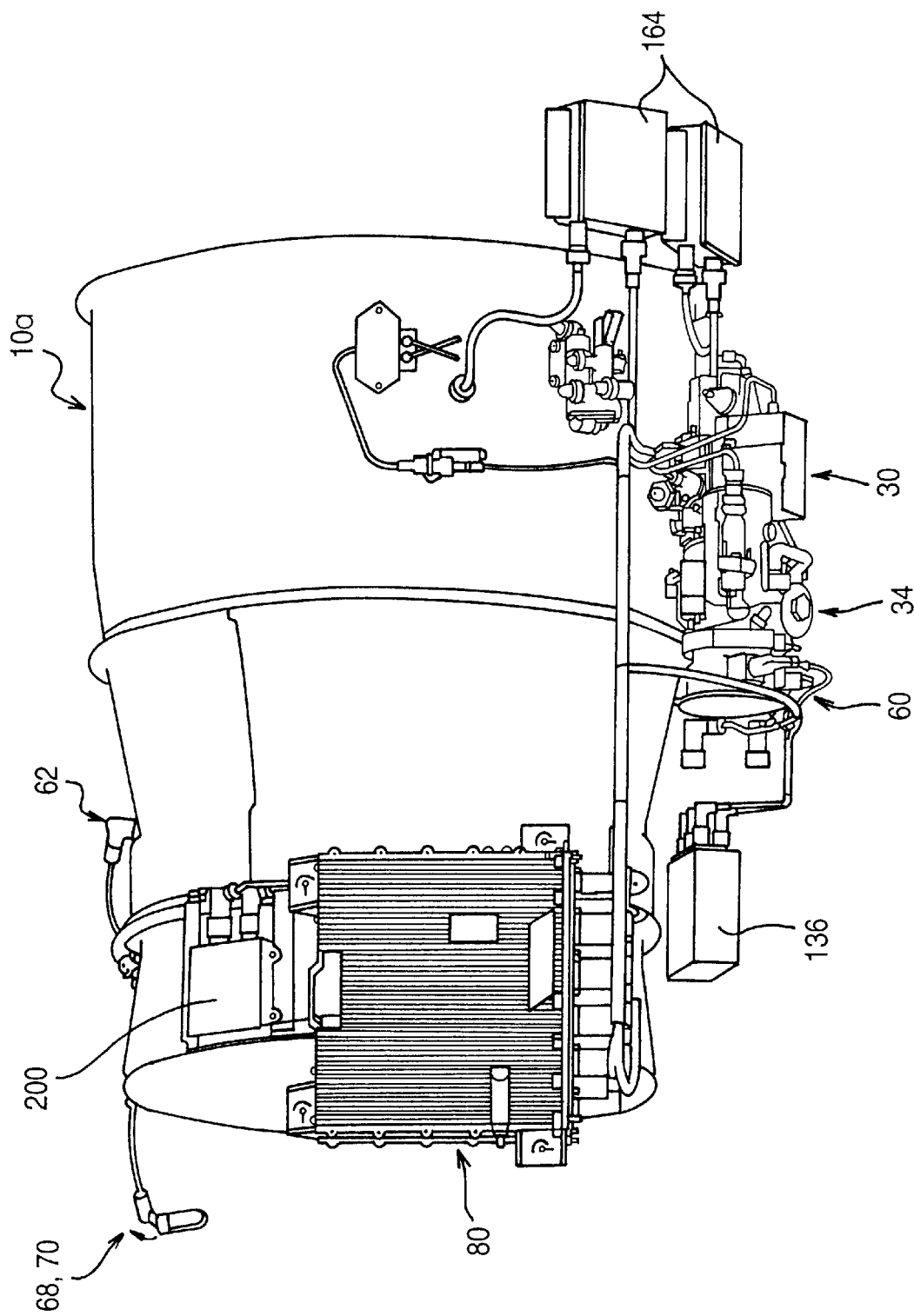
FIG. 6 is a perspective view showing more concretely the layout in the prior art where the components are separately located.
Figure 7:
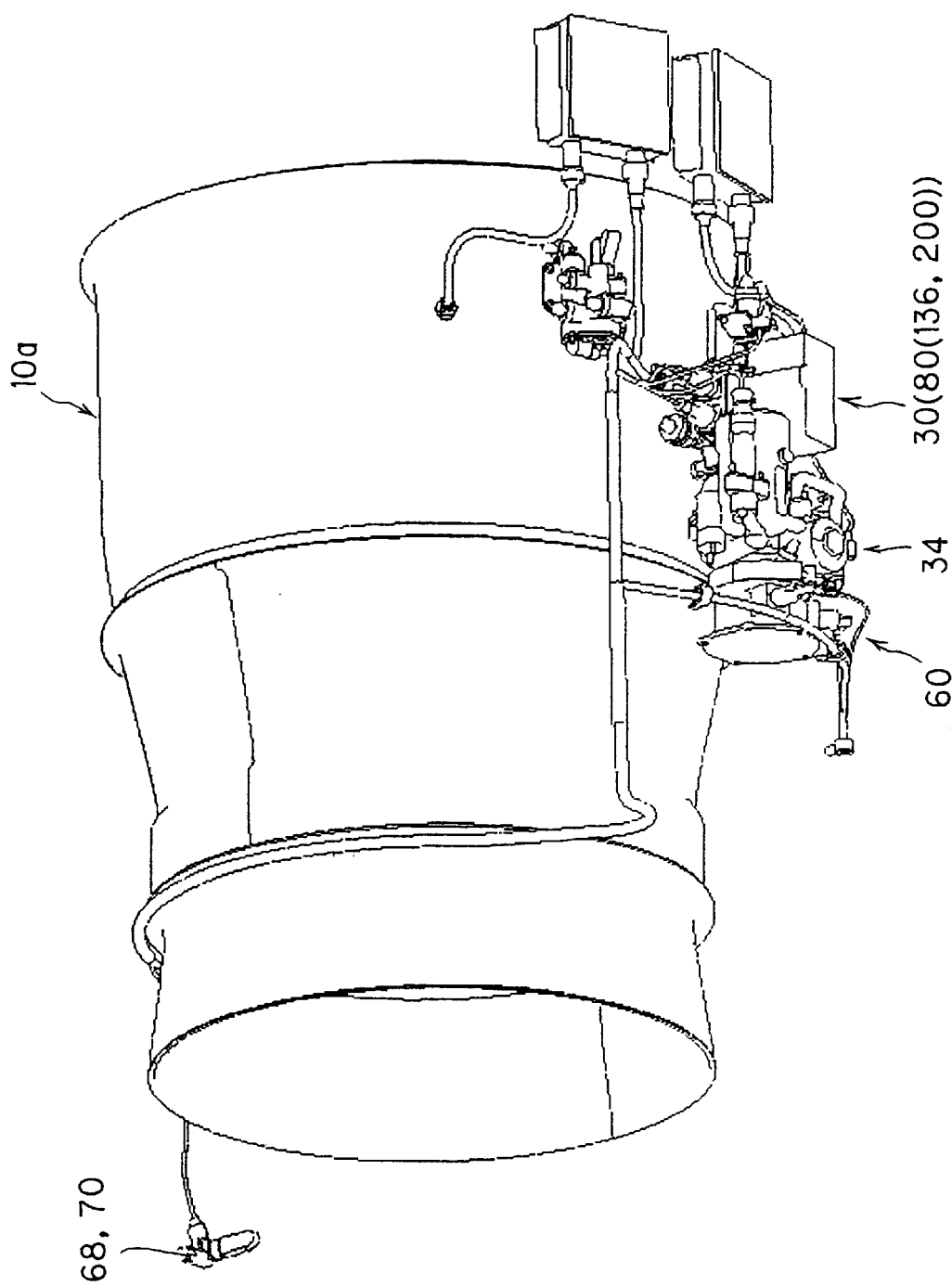
FIG. 7 is a similar view, but showing that in the embodiment of this invention.

FIG. 6 is a perspective view showing more concretely the layout in the prior art where the components are separately located, while FIG. 7 is a similar view, but showing that of this embodiment. It can easily be understood from these figures that the control unit in this embodiment has been decreased in size.

The embodiment is thus configured to have a system for controlling a gas turbine aeroengine (10) having at least a turbine (40 or 42) which is rotated by gas produced by the engine to rotate a rotor (12a or 24a) that sucks in air, having: turbine rotational speed detecting means (ECU 80) for detecting a rotational speed of the turbine (N1 or N2); desired power output detecting means (84) for detecting a desired power output of the engine specified by an operator (TLA); an electronic control unit (ECU 80) which calculates a fuel flow rate command value based at least on the detected rotational speed of the turbine and the desired power output; a fuel control unit (FCU 30) including at least a fuel metering valve (32) which meters fuel to be supplied to the engine based on the calculated fuel flow rate command value; and a fuel supplying system (36, 38, 28, etc.) which supplies fuel to the engine through the fuel control unit. In the system, the electronic control unit (ECU 80) is integrally connected to the fuel control unit (FCU 30).

With this, the number of components of the control unit (made up of the ECU 80 and the FCU 30) is greatly reduced. The control unit is thus reduced in size and hence, its weight is markedly reduced. This also decreases the occurrence of resonance which would otherwise be likely to occur at the components. Moreover, this facilitates maintenance of the control unit. And, since the ECU 80 is connected to the FCU 30 (which is interposed in the fuel supply system), it becomes possible to cool the ECU 80 by fuel.

The system further includes an alternator (PMA 60) which supplies electric power to the electronic control unit (ECU 80) and the fuel control unit (FCU 30); and wherein the alternator (PMA 60) is integrally connected to the fuel control unit (FCU 30). With this, the control unit can further be reduced in size and weight.

In the system, the turbine rotational speed detecting means (ECU 80) detects the rotational speed of the turbine (N2) based on an output of the alternator (PMA 60), more specifically based on the wave form generated by the PMA 60. This makes it unnecessary to provide the N2 and enables it to further reduce the size and weight of the control unit.

In the system, the electronic control unit (ECU 80) calculates the fuel flow rate command value such that the fuel flow rate to be supplied to the engine is brought to a prescribed value, more specifically to zero or a minimum value. This makes it unnecessary to provide the overspeed protector 200 illustrated in the left of FIG. 4 and enables it to reduce the size and weight of the control unit.

In the system, the prescribed value is at least one of zero and a minimum value.

In the system, the electronic control unit (ECU 80) is integrated in one chip and mounted on a board (80a) which is mounted on the fuel control unit (FCU 30).

The system further includes: a power regulator (136) for regulating the electric power to be supplied to the electronic control unit; and wherein the power regulator (136) is mounted on the board (80a).

It should be noted in the above that, although the foregoing embodiments are explained with regard to a turbofan engine as an example of a gas turbine aeroengine, the gas turbine aeroengine can instead be a turbojet engine, a turboprop engine, a turboshaft engine or the like.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a gas turbine aeroengine having at least a turbine which is rotated by gas produced by the engine to rotate a rotor that sucks in air, having:

turbine rotational speed detecting means for detecting a rotational speed of the turbine;

desired power output detecting means for detecting a desired power output of the engine specified by an operator;

an electronic control unit which calculates a fuel flow rate command value based at least on the detected rotational speed of the turbine and the desired power output;

a fuel control unit including at least a fuel metering valve which meters fuel to be supplied to the engine based on the calculated fuel flow rate command value; and a fuel supplying system which supplies fuel to the engine through the fuel control unit;

wherein the improvement comprises;

the electronic control unit and the fuel control unit being a unitary hardware structure;

an alternator which supplies electric power to the electronic control unit and the fuel control unit, the alternator being integrally connected to the fuel control unit; and wherein the turbine rotational speed detecting means detects the rotational speed of the turbine based on an output of the alternator.

2. A system according to claim 1, wherein the electronic control unit calculates the fuel flow rate command value such that the fuel flow rate to be supplied to the engine is brought to a prescribed value.

3. A system according to claim 2, wherein the prescribed value is at least one of zero and a minimum value.

4. A system for controlling a gas turbine aeroengine having at least a turbine which is rotated by gas produced by the engine to rotate a rotor that sucks in air, having:

turbine rotational speed detecting means for detecting a rotational speed of the turbine;

desired power output detecting means for detecting a desired power output of the engine specified by an operator;

electronic control unit which calculates a fuel flow rate command value based at least on the detected rotational speed of the turbine and the desired power output;

a fuel control unit including at least a fuel metering valve which meters fuel to be supplied to the engine based on the calculated fuel flow rate command value; and a fuel supplying system which supplies fuel to the engine through the fuel control unit;

wherein the improvement comprises;

the electronic control unit and the fuel control unit being a unitary hardware structure;

an alternator which supplies electric power to the electronic control unit and the fuel control unit, the alternator being integrally connected to the fuel control unit; and wherein the turbine rotational speed detecting means detects the rotational speed of the turbine based on an output of the alternator and the electronic control unit is integrated in one chip and mounted on a board which is mounted on the fuel control unit.

5. A system for controlling a gas turbine aeroengine having at least a turbine which is rotated by gas produced by the engine to rotate a rotor that sucks in air, having:

turbine rotational speed detecting means for detecting a rotational speed of the turbine;

desired power output detecting means for detecting a desired power output of the engine specified by an operator;

an electronic control unit which calculates a fuel flow rate command value based at least on the detected rotational speed of the turbine and the desired power output;

a fuel control unit including at least a fuel metering valve which meters fuel to be supplied to the engine based on the calculated fuel flow rate command value; and a fuel supplying system which supplies fuel to the engine through the fuel control unit;

wherein the improvement comprises;

the electronic control unit and the fuel control unit being a unitary hardware structure;

an alternator which supplies electric power to the electronic control unit and the fuel control unit, the alternator being integrally connected to the fuel control unit; and a power regulator for regulating the electric power to be supplied to the electronic control unit;

wherein the turbine rotational speed detecting means detects the rotational speed of the turbine based on an output of the alternator and the electronic control unit is integrated in one chip and mounted on a board which is mounted on the fuel control unit; and wherein the power regulator is mounted on the board.

* * * * *